United States Patent [19]

Ulbers

[11] Patent Number: 4,886,365

[45] Date of Patent: Dec. 12, 1989

[54] DISTANCE MEASURING DEVICE

[75] Inventor: Gerd Ulbers, VS-Schwenningen, Fed. Rep. of Germany

[73] Assignee: Hommelwerke GmbH, VS-Schwenningen, Fed. Rep. of Germany

[21] Appl. No.: 200,627

[22] Filed: May 31, 1988

[30] Foreign Application Priority Data

May 29, 1988 [DE] Fed. Rep. of Germany ....... 3718192

[51] Int. Cl.$^4$ .............................................. G01B 9/02
[52] U.S. Cl. .................................... 356/351; 356/358
[58] Field of Search ......................... 356/349, 351, 358

[56] References Cited

U.S. PATENT DOCUMENTS

| | | | |
|---|---|---|---|
| 4,360,271 | 11/1982 | Downs et al. | 356/351 |
| 4,717,255 | 1/1988 | Ulbers | 356/358 X |
| 4,744,661 | 5/1988 | Ulbers et al. | 356/358 |

*Primary Examiner*—Davis L. Willis
*Assistant Examiner*—Matthew W. Koren
*Attorney, Agent, or Firm*—Allegretti & Witcoff, Ltd.

[57] ABSTRACT

A device for measuring the distance between the device and a measuring surface, with an optical interferometer, which has a measuring wave guide, one end of which is connected with a laser and the other of which is directed to optical measuring reflector which is positioned on the measuring surface or is connected with the same in an effective manner, which reflects the light back into the measuring wave guide. The interferometer furthermore has a reference wave guide which is coupled with the measuring wave guide at a coupling point, has a mirror on its one end, and on its other end, a photoelectrical converter, which is connected with an indicator device for indicating the electrical output signal of the photoelectrical converter. The reference wave guide is coupled, preferably by means of a polarizing beam splitter, with a branch wave guide, the end of which is connected with an additional photoelectrical converter. The reference wave guide has a phase adjustment device. The outputs of the photoelectrical converter are connected with a differential amplifier, the output signal of which is free from direct current and, is fed into the indicator device. Because the output signal of the differential is free from direct current, the further processing of the interference output signal is facilitated and the measuring precision is increased.

6 Claims, 1 Drawing Sheet

DISTANCE MEASURING DEVICE

BACKGROUND OF THE INVENTION

1. Field of the Invention

The invention relates to a device for measuring the distance between the device and a measuring surface, utilizing an interferometer.

2. Description of the Prior Art

The German Patent Application P 36 30 887 describes a device of the type under discussion. The interferometer used there supplies, at the output of the photoelectrical converter, not only an output signal corresponding to the interference between the light in the measuring and the reference wave guide, but, in addition, a direct current signal, since the photoelectrical converter is continually illuminated at any specific light level, and must have some positive voltage under those conditions. This direct current signal makes the further processing in, for example, a meter which is connected to the output side, more difficult. Filtering of the direct current signal by condensers is not possible. Since the disturbing direct current oscillates, compensation by means of a compensation voltage is not feasible.

SUMMARY OF THE INVENTION

It is an object of the invention to provide a device of the type under discussion, in which an alternating current signal corresponding to the interference is available without any direct current component.

The basic concept consists of the fact that, from the same source, the uniform signal which acts in a disruptive manner is to be produced once again without the interference signal. Both signals are then so combined in either a voltage-type or frequency-type differential circuit in such a manner that the uniform d.c. signal is subtracted, and the output signal alone is available.

In the voltage-type embodiment, the phase adjustment device can be effected by two electrodes which are positioned on both sides of the branch wave-guide over said wave-guide, and are connected to an adjustable direct current source. Particularly suitable, however, is the embodiment in which the phase adjustment devices are formed by lambda/4 plates or by other solid lambda/4 phase shifters, so that the device is completely free from any unstable electronic variations.

In this embodiment, the output voltages are generated twice with the help of two reference wave guides. The light in the reference wave-guide is circularly polarized by the lambda/4 plates, mentioned above. The difference is that, with the aid of a polarizing beam splitter, the phase is adjusted such that both output voltages differ in their phase position by 90°. They can thus serve for the formation of a rotary interference field, and can subsequently be used to drive an up/down counter.

The frequency-type embodiment whereby the electrical circuit is constructed in a relatively simple manner, is also simple, optically. The basic concept of the frequency-type embodiment consists of superimposing upon the light used a certain frequency, and operating the interferometer on the basis of this frequency. Said frequency is available in the mixer unit as a pure alternating current, without any encumbering direct current portion.

In this frequency-type alternative solution to the problem addressed by the invention, the two output voltages can be shifted by 90° relative to one another. The 90° shift can be carried out electronically by placing a phase shifter between the oscillator and the second mixer unit. The output voltage of the interferometer, which consists of the modulation frequency and the superimposed interference frequency, which is caused by the changing path length of the measuring arm, is conveyed to the second mixer unit, just as it is to the first mixer unit. The modulation frequency is then subtracted from the interference signals to get the change in frequency, which is proportional to the changing path-length distance.

BRIEF DESCRIPTION OF THE DRAWINGS

The invention will now be illustrated in greater detail by means of the diagram, in two embodiments.

DETAILED DESCRIPTION OF THE PREFERRED EMBODIMENT

Figure 1:
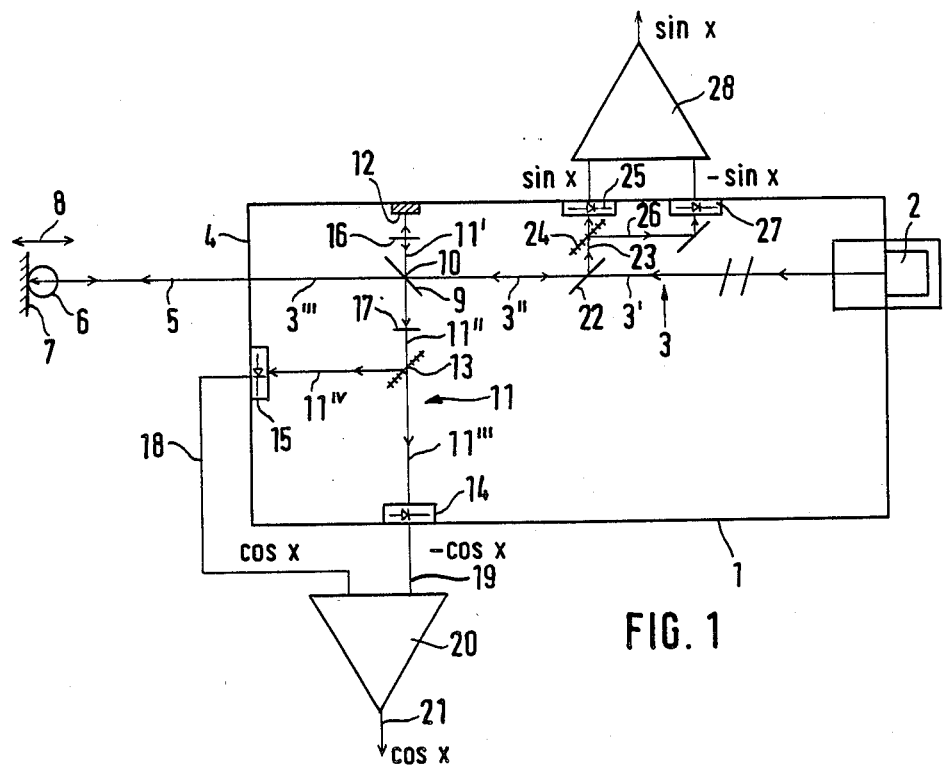
FIG. 1: Depicts an embodiment of the voltage-type alternative of the solution in accordance with the invention.

FIG. 1 depicts a plate (1), which consists, in the manner known to those skilled in the art, of layers of Si, $SiO_2$, $Si_3N_4$ and $SiO_2$. Several photoactive elements and connectors are positioned in the last-named layer. A laser (2) is positioned laterally on the plate (1), which laser emits light into the layer of $Si_3N_4$. In this layer, there is a measuring wave guide (3) into which the laser shines, as well as sections ($3^I$, $3^{II}$ and $3^{III}$). The end of the measuring wave guide ($3^{III}$) away from the laser (2) discharges from an edge in the plate (1), where the light exits as a beam (5), and strikes a measuring reflector (6), which is positioned on a measuring surface (7), the distance of which from the edge (4) is to be measured with the deivce. This distance is variable, which is indicated by the double arrow (8).

The measuring wave guide (3) is, by means of a beam splitter (9) at the coupling point (10), coupled with the reference wave guide (11), which is divided into sections ($11^I$, $11^{II}$, and $11^{III}$). Section ($11^I$) contains the reference mirror (12). On the other side of the coupling point (10), is the quarter-wave plate (17), which effects a phase shift of lambda/4. The quarter-wave plate functions to circularly polarize the laser light. Section part ($11^{II}$) of the reference wave guide (11) leads to a polarizing beam splitter (13), at which the light is split into section ($11^{III}$) and then into a section ($11^{IV}$). The effect of the polarizing beam splitter is to pass one orientation of light, while causing the other portion to be reflected. Thus, two orthogonally-polarized beams impinge upon photodiodes 14 and 15. Their phase difference is naturally 90°. Section ($11^{III}$) leads to a photodiode (14), while section ($11^{IV}$) leads to another photodiode (15).

Interference maxima and minima form a rotary field due to the circular polorization. The number of fringes are directly proportional to the distance moved by the measuring surface.

The outputs of the photodiodes (14 and 15), are affected by a significant direct current component. The outputs of said photodiodes also differ in phase by 180°, as is indicated by the notation cos x and −cos x. These signals are sent through connectors (18 and 19), to differential amplifier (20), in which the common d.c. component is subtracted, so that differential amplifier output signal cos x, which is free from the direct current component, can be conveyed to a meter for counting the interference voltage.

In the embodiment in accordance with FIG. 1, a beam splitter (22) is situated (3) between sections (3$^I$ and 3$^{II}$), wherein said beam splitter conveys a portion of the light through a light wave guide (23) and a polarizing beam divider (24) once to a photodiode (25), and, through an additional light wave guide (26), again to an additional photodiode (27). The output signals of the photodiodes (25 and 27) differ in their phase relation by 180°, but by 90° relative to the output voltages of the photodiodes (14 and 15), since no phase shifter, such as the phase shifter (17), is positioned in the path of the light from the measuring wave guide (3) to the photodiodes (25 and 27). Thus, the reference and measuring signals differ in this respect by 90°. The output signals of the photodiodes (25 and 27) are fed into a differential amplifier (28), the output of which is a direct current-free output signal sin x, which, for the reasons stated above, differs in phase by 90° from the output signal cos x of the differential amplifier (20). An up/down counter, not depicted in the diagram, which indicates the motion, forward or back, of the measuring reflector (6) can be controlled with the help of both these sin x and cos x signals, which can form the rotary field.

Figure 2:
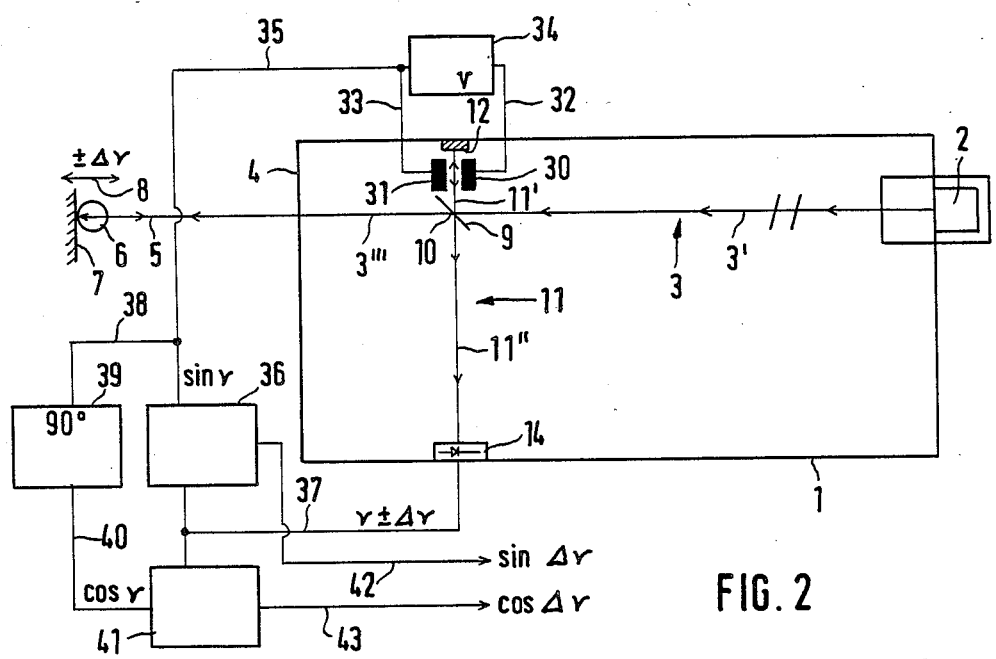
FIG. 2: Depicts an embodiment of the frequency-type alternative of the invention.

FIG. 2 depicts an embodiment for the frequency-based solution of the problem addressed by the invention. The basis here again is also an interferometer, such as is used in the embodiment in accordance with FIG. 1. Corresponding parts are provided with the same reference figures. Section (11$^I$) has a modulator with electrodes (30 and 31), which are connected to an oscillator (34) by means of connectors (32 and 33), said oscillator having a frequency range normally of 30 to 50 MHz. This frequency can, however, also lie significantly higher or lower. The oscillator (34) is connected directly to the first mixer unit input of mixer (36) by means of a connector (35). The other mixer input of said mixer is connected to the photodiode (14) by means of a connector (37).

The oscillator signal wire (35) connects, via wire (38), to a 90°-phase shifter (39), which is connected to a second mixer unit (41) by means of connector (40). Photodiode (14) provides the other input signal to mixer (41), as in mixer (36).

Because of the modulation of the light in section (11$^I$) of the reference wave guide (11), the frequency of the oscillator is superimposed upon the output of the photodiode (14). The oscillator frequency is simultaneously conveyed to the mixer unit (36) by means of connector (35). This mixer subtracts the oscillation frequency from the photodiode output frequency, with the output signal being sin $\Delta v$.

The light travels through section (3$^{III}$) of the measuring wave guide (3) to the measuring reflector (6), and back through the beam splitter (9), into section (11$^{II}$) of the reference wave guide. This light packet does not alter the output signal of the photodiode (14) in frequency if the measuring reflector (6) is at rest. If, on the other hand, the measuring reflector (6) moves in either direction of the double arrow (8), then, because of the Doppler effect, the light leaving the mirror is changed in frequency in a manner that correlates to the direction and distance of travel. Change in frequency is represented by $v \pm \Delta v$. The consequence of this is that, at the output of the photodiode (14), the frequency $+/- \Delta v$ appears, and, since the oscillator frequency is subtracted in the mixer unit (36), only the frequency difference appears at its output at (42). The phases of the two output signals are predetermined by the phase shifter, which here is 90° to give two signals, sin $\Delta v$ and cos $\Delta v$.

The same processes take place in regard to the mixer unit (41), whereby the phase of the alternating current with oscillator frequency v is shifted by 90° directly by the phase shifter (39), so that the output alternating current is correspondingly shifted, at the output connector (43) of the mixer unit (41), by 90° relative to that at the output lead (42), which is characterized by cos v in the diagram. As a result two alternating currents displaced in phase relative to one another by 90°, the frequency of which corresponds to the Doppler-shifted frequency, which is determined by the movement of the measuring reflector (6), is seen at the output connectors (42 and 43). This Doppler-shifted frequency is thus, with respect to the frequency v, a measure of the distance change of the measuring reflector (6) from the edge (4). An up/down counter, which is connected to the outputs of the mixer units (42 and 43) in a manner not depicted, is easily calibrated to indicate the changes in distance. Thus, absolute distances between the measuring surface (7) or the measuring reflector (6) and the edge (4) attached thereto can be determined as an absolute value.

I claim:

1. A device for measuring the distance between the device and a measuring surface, comprising, in combination:

an optical interferometer, having a measuring wave guide, one end of which is connected to a laser, and the other end of which is directed to an optical measuring reflector positioned on or connected to the measuring surface, wherein the reflector reflects the laser light into the measuring wave guide;

a first reference wave guide provided in the interferometer intersecting the measuring wave guide at a first coupling point, the first reference wave guide having a mirror at one end, a first photoelectric converter at the opposing end, and a phase adjustment device between the coupling point and the first photoelectric converter; and a first branch wave guide provided in the interferometer having one end coupled to the first reference wave guide by a first polarizing beam splitter located between the phase adjustment device and the first photoelectric converter, and a second photoelectric converter located at the opposing end of the first branch wave guide, wherein the phase of the light in the first branch wave guide is shifted relative to the phase of the light in the first reference wave guide and the outputs of the first and second photoelectric converters are connected to a first differential amplifier, whereby the first differential amplifier provides an output signal which is free from a direct current component and is fed into an indicator device for indicating the electrical output signal of the first and second photoelectric converters.

2. A device as claimed in claim 1 wherein the phase adjustment device shifts the phase of the light 90 degrees.

3. A device in claim 1 further comprising:

a second reference wave guide having one end coupled to the measuring wave guide between the laser and the first coupling point and a third photoelectric converter located at the opposing end of the second reference wave guide; and a second branch wave guide having one end coupled to the second reference wave guide by a second polarizing beam splitter, and a fourth photoelectric converter located at the opposing end of the second branch wave guide, wherein the phase of the light in the second branch wave guide is shifted relative to the phase of the light in the second reference wave guide and the outputs of the third and fourth photoelectric converters are connected to a second differential amplifier, whereby the second differential amplifier provides an output signal which is free from a direct current component and wherein the outputs of the first and second differential amplifiers are connected to an up/down counter.

4. A device for measuring the distance between the device and a measuring surface, comprising, in combination:

an optical interferometer having a measuring wave guide, one end of which is connected to a laser, and the other end of which is directed to an optical measuring reflector positioned on or connected to the measuring surface, wherein the reflector reflects the laser light into the measuring wave guide;

a reference wave guide provided in the interferometer intersecting the measuring wave guide at a coupling point, the reference wave guide having a mirror at one end, and a photoelectric converter at the opposing end;

a signal modulator connected inside the reference wave guide between the coupling point and the mirror, the signal modulator being connected to the output of an oscillator; and a first mixer unit being connected to the output of the oscillator, and into which the output signal of the photoelectric converter is fed, wherein the output of the first mixer unit is connected to a meter forming an indicator device, whereby the electrical output signal of the photoelectric converter is indicated.

5. A device as claimed in claim 4 wherein the signal modulator is comprised of two electrodes which extend on and over both sides of the reference wave guide.

6. A device as claimed in claim 4 further comprising:

a 90 degree phase shifter connected to the output of the oscillator; and a second mixer unit connected to the output of the 90 degree phase shifter, and connected to the output signal of the photoelectric converter, wherein the outputs o the first and second mixer units are connected to an up/down counter which forms an indicator device.

* * * * *